(12) United States Patent
Kato et al.

(10) Patent No.: US 9,958,614 B2
(45) Date of Patent: May 1, 2018

(54) FIBER COUPLER FOR SILICON PHOTONICS

(71) Applicant: INPHI CORPORATION, Santa Clara, CA (US)

(72) Inventors: Masaki Kato, Palo Alto, CA (US); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days. days.

(21) Appl. No.: 15/786,156

(22) Filed: Oct. 17, 2017

(65) Prior Publication Data

US 2018/0039027 A1 Feb. 8, 2018

Related U.S. Application Data (60) Division of application No. 15/374,977, filed on Dec. 9, 2016, now Pat. No. 9,823,420, which is a
(Continued)

(51) Int. Cl.
*G02B 6/30* (2006.01)
*G02B 6/136* (2006.01)
(Continued)

(52) U.S. Cl.
CPC ............ *G02B 6/305* (2013.01); *G02B 6/1228* (2013.01); *G02B 6/136* (2013.01); *G02B 2006/12061* (2013.01)

(58) Field of Classification Search
None
See application file for complete search history.

(56) References Cited

U.S. PATENT DOCUMENTS 5,592,612 A  1/1997  Birk
6,128,094 A  10/2000 Smith
(Continued)

OTHER PUBLICATIONS

Office Action for U.S. Appl. No. 13/653,373, dated Mar. 27, 2014.
(Continued)

*Primary Examiner* — Uyen Chau N Le
*Assistant Examiner* — Chad H Smith
(74) *Attorney, Agent, or Firm* — Richard T. Ogawa; Ogawa P.C.

(57) ABSTRACT

An apparatus for converting fiber mode to waveguide mode. The apparatus includes a silicon substrate member and a dielectric member having an elongated body. Part of the elongated body from a back end overlies the silicon substrate member and remaining part of the elongated body up to a front end is separated from the silicon substrate member by a second dielectric material at an under region. The apparatus also includes a waveguide including a segment from the back end to a tail end formed on the dielectric member at least partially overlying the remaining part of the elongated body. The segment is buried in a cladding overlying entirely the dielectric member. The cladding has a refractive index that is less than the waveguide but includes an index-graded section with decreasing index that is formed at least over the segment from the tail end toward the back end.

16 Claims, 7 Drawing Sheets

Related U.S. Application Data continuation of application No. 14/602,164, filed on Jan. 21, 2015, now Pat. No. 9,547,129.

(51) Int. Cl.
  *G02B 6/122*  (2006.01)
  *G02B 6/12*  (2006.01)

(56) References Cited

U.S. PATENT DOCUMENTS

| | | |
|---|---|---|
| 6,400,621 B2 | 6/2002 | Hidaka et al. |
| 6,542,956 B1 | 4/2003 | Lee et al. |
| 6,993,701 B2 | 1/2006 | Corbett et al. |
| 7,656,727 B2 | 2/2010 | Thayer |
| 7,990,746 B2 | 8/2011 | Rajan |
| 8,325,554 B2 | 12/2012 | Sweere et al. |
| 8,687,451 B2 | 4/2014 | Wang |
| 2004/0123029 A1 | 6/2004 | Dalal et al. |
| 2006/0200697 A1 | 9/2006 | Ito |
| 2008/0104290 A1 | 5/2008 | Cowell et al. |
| 2008/0183959 A1 | 7/2008 | Pelley et al. |
| 2009/0141558 A1 | 6/2009 | Sarin et al. |
| 2009/0300259 A1 | 12/2009 | Luo et al. |
| 2010/0005212 A1 | 1/2010 | Gower et al. |
| 2010/0162037 A1 | 6/2010 | Maule et al. |
| 2010/0199125 A1 | 8/2010 | Reche |
| 2010/0274952 A1 | 10/2010 | Lee |
| 2011/0072200 A1 | 3/2011 | Lee et al. |
| 2011/0125990 A1 | 5/2011 | Khosravi et al. |
| 2011/0170329 A1 | 7/2011 | Kang |
| 2012/0151294 A1 | 6/2012 | Yoo et al. |
| 2012/0243299 A1 | 9/2012 | Shau |
| 2012/0257459 A1 | 10/2012 | Berke |
| 2012/0297231 A1 | 11/2012 | Qawami et al. |
| 2013/0060996 A1 | 3/2013 | Berke |
| 2013/0322816 A1* | 12/2013 | Takahashi ............ G02B 6/1228 385/27 |

OTHER PUBLICATIONS

Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 16, 2014.
Office Action for U.S. Appl. No. 13/791,807, dated May 29, 2014.
Office Action for U.S. Appl. No. 14/178,241, dated Jun. 27, 2014.

* cited by examiner

The index of surrounding material is slightly lower than SiO2

SiONx ←―――――――― SiO2

Gradually increase the index of cladding material

Fig. 7

The index of surrounding material is slightly lower than SiO2

SiONx ←―――――――― SiO2

Gradually increase the index of cladding material

FIBER COUPLER FOR SILICON PHOTONICS

CROSS-REFERENCE TO RELATED APPLICATIONS

This application is a division of and claims priority to U.S. application Ser. No. 15/374,977, filed Dec. 9, 2016, which is a continuation of and claims priority to U.S. application Ser. No. 14/602,164, filed Jan. 21, 2015, now U.S. Pat. No. 9,547,129 issued Jan. 17, 2017, commonly assigned and incorporated by reference herein for all purposes.

BACKGROUND OF THE INVENTION

The present invention relates to silicon photonic devices and methods. More particularly, the present invention provides improved fiber couplers and methods for coupling fiber to silicon waveguide with enhanced coupling efficiency.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, the conventional fiber coupling has >3 dB loss in optical power from fiber into a buried silicon waveguide due to poor mode coupling from bigger fiber mode to small waveguide mode. Therefore, fiber couplers with improved and index grading methods, regardless of suspended type or partially supported type, for coupling optical signal from fiber to silicon waveguide are desired.

BRIEF SUMMARY OF THE INVENTION

The present invention relates to silicon photonic devices and methods. Various embodiments of the present invention provide a fiber coupling device for coupling a single-mode optical fiber to a buried silicon waveguide. More specifically, multiple embodiments provide methods for forming coupling structures to adapt the optical mode such that the light from the silicon core of the buried waveguide can be coupled into the fiber core with substantially minimized power loss. In certain embodiments, the invention is applied for high bandwidth optical communication, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

Serial link performance is limited by the channel electrical bandwidth and the electronic components. In order to resolve the inter-symbol interference (ISI) problems caused by bandwidth limitations, we need to bring all electrical components as close as possible to reduce the distance or channel length among them. Stacking chips into so-called 3-D ICs promises a one-time boost in their capabilities, but it's very expensive. Another way to achieve this goal in this disclosure is to use multiple chip module technology.

In an example, an alternative method to increase the bandwidth is to move the optical devices close to electrical device. Silicon photonics is an important technology for moving optics closer to silicon. In this patent application, we will disclose a high speed electrical optics multiple chip module device to achieve terabits per second speed, as well as variations thereof In a specific embodiment, the present invention provides an apparatus for converting fiber mode to waveguide mode. The apparatus includes a silicon substrate member. Additionally, the apparatus includes a dielectric member having an elongated body. Part of the elongated body from a back end overlies the silicon substrate member and remaining part of the elongated body up to a front end is separated from the silicon substrate member by a second dielectric material at an under region. Furthermore, the apparatus includes a waveguide including a segment from the back end to a tail end formed on the dielectric member at least partially overlying the remaining part of the elongated body. The segment is buried in a cladding overlying entirely the dielectric member below from the front end to the back end while being covered by the second dielectric material from both sides and top. The cladding has a refractive index that is less than the waveguide but includes an index-graded section formed at least over the segment with decreasing index from the tail end toward the back end.

In another specific embodiment, the present invention provides an apparatus for converting fiber mode to waveguide mode, the apparatus includes a silicon substrate member and a waveguide including a segment from a back end to a tail end. The segment throughout is buried from the back end to a front end in a cladding of about 10-20 times in cross-section dimension such that the tail end of the segment is located a finite distance away from the front end of the cladding. The apparatus further includes a first dielectric material configured to provide support to the cladding. The first dielectric material partially rests on the silicon substrate member except a undercut region below. Additionally, the apparatus includes a second dielectric material filling the undercut region and covering the cladding and the first dielectric material except the front end. The segment is configured to connect rest waveguide circuit from the back end. The front end is configured to couple with an optical fiber. The first dielectric material has a refractive index substantially same as that of the cladding. The second dielectric material has a refractive index less than that of the first dielectric material. The cladding has a refractive index that is less than the waveguide and includes an index-graded section formed at least over the segment with decreasing index from the tail end toward the back end.

In an alternative embodiment, the present invention provides a method for manufacturing an apparatus of converting fiber mode to waveguide mode. The method includes providing a silicon substrate member. Further, the method includes forming a first dielectric material overlying the silicon substrate member. The first dielectric material is patterned to at least one elongated body from a front end to a back end. Additionally, the method includes forming a waveguide segment on the first dielectric material. The waveguide segment is laid along the elongated body from the back end and ended with a tail end near the front end. The waveguide has a refractive index greater than that of the first dielectric material. Further, the method includes removing the first dielectric material at both sides of the elongated body and substantially all silicon material below the elongated body to form a cavity at sides and at least part of bottom regions of the elongated body of only the first dielectric material supporting the waveguide segment. Furthermore, the method includes covering at least top of the elongated body including the first dielectric material and the segment of the waveguide by a cladding. The cladding has a refractive index similar to that of the first dielectric material. Moreover, the method includes grading at least a partial section of the cladding such that index contrast is gradually increased from the tail end to the back end of the segment of the waveguide. The method still includes filling the cavity and top of the cladding with a second dielectric material having a refractive index between that of air and that of the first dielectric material.

In yet another alternative embodiment, the present invention provides a method for manufacturing an apparatus of converting fiber mode to waveguide mode. The method includes forming a waveguide including a segment from a back end to a tail end. Additionally, the method includes forming a cladding fully surrounding the waveguide such that the segment is buried therein with a finite distance from the tail end to a front end face of the cladding. The cladding has a refractive index less than that of the waveguide. Furthermore, the method includes grading at least a partial section of the cladding over the segment such that index contrast between the cladding and the waveguide segment is gradually increased from the tail end to the back end of the segment of the waveguide. Moreover, the method includes providing a dielectric material to at least partially cover the cladding except the front end face and to provide support to the cladding, the dielectric material having a refractive index between that of air and that of the cladding. The front end face is configured to couple with an optical fiber and the segment connects to rest of waveguide circuit from the back end.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to silicon photonic devices and methods. Various embodiments of the present invention provide a fiber coupling device for coupling a single-mode optical fiber to a buried silicon waveguide. More specifically, multiple embodiments provide methods for forming coupling structures to adiabatically adapt the mode such that the light from the silicon core of the buried waveguide can be coupled to the fiber with reduced power loss. In certain embodiments, the invention is applied for high bandwidth optical communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
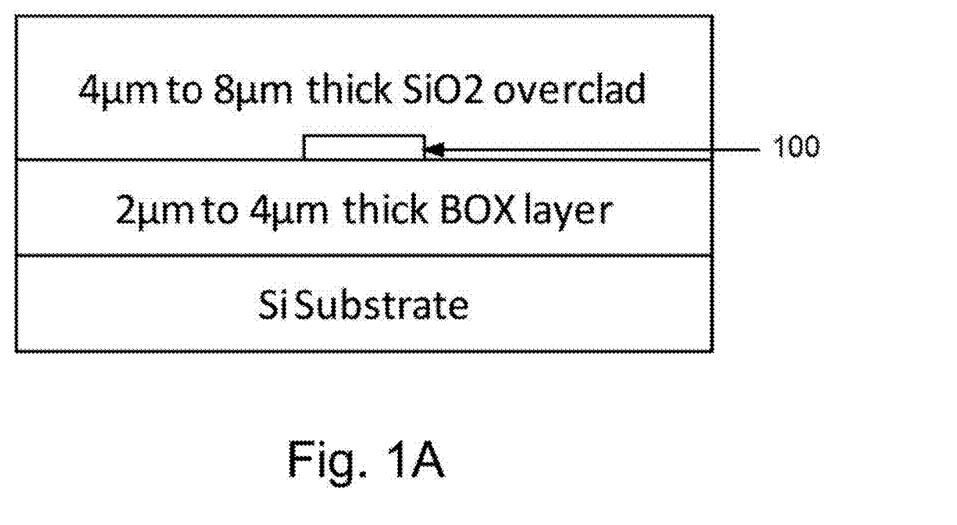
FIG. 1A is a simplified diagram of a cross-sectional view of a typical buried silicon waveguide structure according to a prior art.

FIG. 1A is a simplified diagram of a cross-sectional view of a typical buried silicon waveguide structure according to a prior art. For forming a silicon-based waveguide, a silicon substrate is provided and a buried oxide layer (BOX) of 2 μm to 4 μm overlays the silicon substrate. A 200 nm to 350 nm thick silicon layer is formed overlying the BOX layer before etching the silicon layer to form a 300 nm to 600 nm wide near-one-dimensional waveguide structure 100. A silicon dioxide cladding material of about 4 mm to 8 mm in thickness is formed to bury the previously formed waveguide structure 100, which becomes a buried Si waveguide core 100 having the dimension of about 200 nm to 350 nm in thickness and 300 nm to 600 nm in width. This buried Si waveguide core 100 is a typical waveguide structure used in various silicon photonic devices.

Figure 1B:
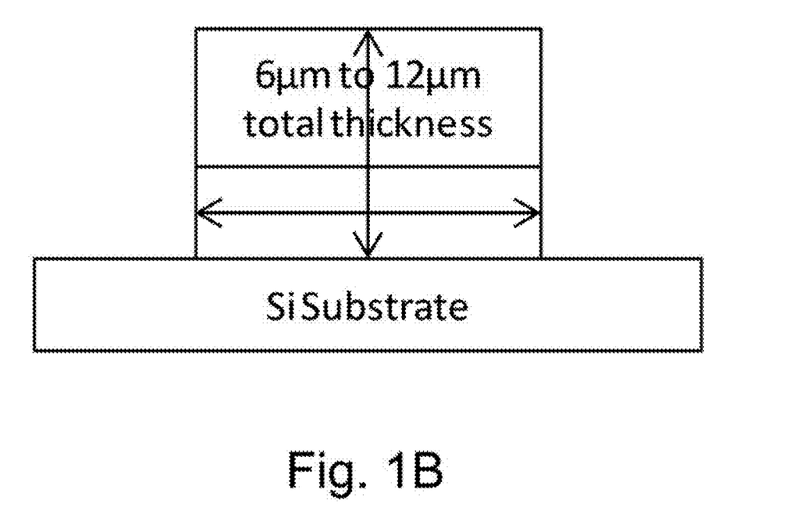
FIG. 1B is a simplified diagram of a cross-sectional view of a cladding material without the buried silicon waveguide having good match to the single mode fiber according to a prior art.

FIG. 1B is a simplified diagram of a cross-sectional view of a cladding material without the buried silicon waveguide having good match to the single mode fiber according to a prior art. In order to implement the waveguide in silicon photonics for optical transmission, a fiber coupler configured to couple the single mode fiber with this waveguide structure. FIG. 1B shows a cross-section view of an exemplary base structure for forming a fiber coupler on a silicon substrate, which is simply a similar bi-layer structure like FIG. 1A but without the buried waveguide core. In particular, when coupling a single mode fiber with a side face of the bi-layer structure such that optical mode at the side face is found a good match with a cross-section dimension ranged from 6 μm×6 μm to 12 μm×12 μm of the bi-layer structure (without waveguide) supported on the silicon substrate. Since Si has higher refractive index than SiO2, the height of the bi-layer structure needs at least 6 μm in height to avoid optical mode size over the bottom line in the substrate to cause power loss. In order to reduce fiber coupling loss, it is preferred to have a cladding material having lower refractive index than that of SiO2 to be disposed surrounding the cross-section of the bi-layer structure.

Figure 2:
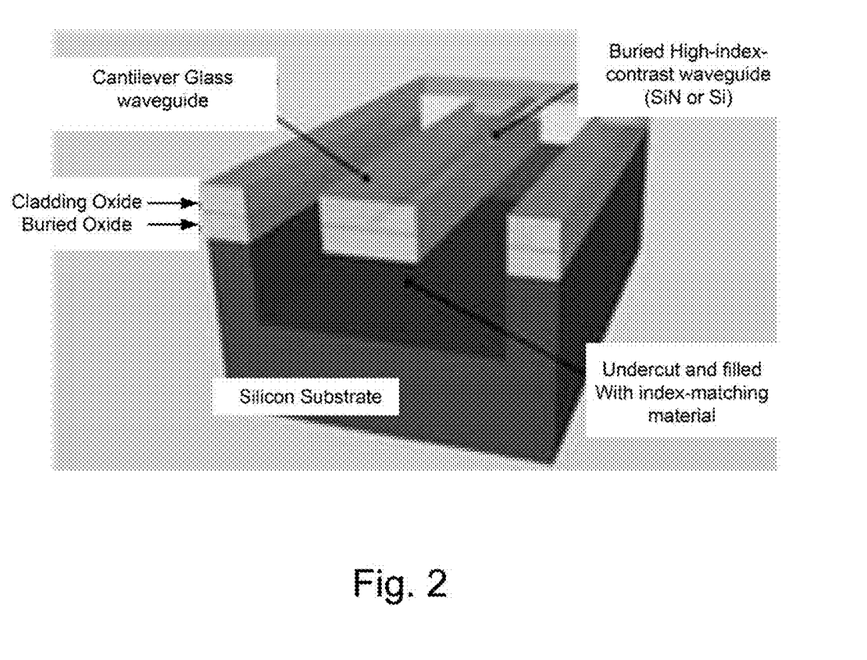
FIG. 2 is a simplified diagram of a perspective view of a fiber coupler suspended with air clad according to a prior art.

FIG. 2 is a simplified diagram of a perspective view of a fiber coupler suspended with air clad according to a prior art. The goal of the fiber coupler is to gradually adapt optical mode of fiber core at a front end face with the Si waveguide at a back end face and down-stream such that the light from the fiber or silicon core can be coupled to the silicon core or fiber with minimal loss. The fiber is circular symmetric structure with a circular symmetric mode. Thus a symmetric cladding for the fiber coupler between the two end faces (i.e., the adaptor region) is preferred. One ideal cladding for this purpose is air. Alternatively, an organic material of properly chosen index can be used to replace air for making index matching across the adaptor region.

FIG. 2 shows an example of a conventional suspended fiber coupler with the adaptor region above a hollow undercut region which is formed by etching out part of silicon substrate to form a cantilever glass waveguide. The cantilever glass waveguide is made of a bi-layer structure as described above: one buried SiO2 layer at the bottom and one Cladding SiO2 layer at the top. Additionally, from somewhere near but a distance away from the end face for fiber coupling, a buried high-index-contrast waveguide made by SiN or Si is buried in between the buried SiO2 layer and Cladding SiO2 layer. The buried waveguide core also needs to be tapered in shape to force the mode in the lower index contrast cladding region near the front end face and gradually adapt the mode of silicon core near the higher index contrast cladding region at the back end face of the cantilever glass waveguide.

Figure 3:
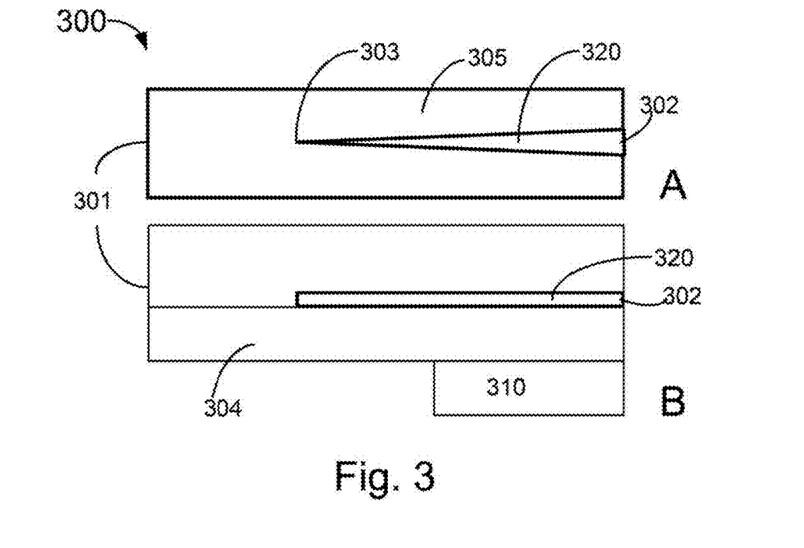
FIG. 3 is a simplified diagram of a top view (A) and a side view (B) of a conventional suspended fiber coupler according to a prior art.

FIG. 3 is a simplified diagram of a top view (A) and a side view (B) of a conventional suspended fiber coupler according to a prior art. This figure provides more detail of the convention suspended fiber coupler structure 300. As seen in the part A of the figure, it shows a top view of the cladding material or adaptor region 305 with the buried Si waveguide core 320 in tapered shape from a small tail end 303 of 0.15 μm dimension closer to the front end face 301 to the end of about 0.5 μm dimension at the back end interface 302 which naturally connects rest of Si waveguide circuits in an silicon photonics device. This tapered shape of the buried Si waveguide core provides a gradual index contrast change to induce an optical mode adaption from large fiber mode to small Si waveguide mode. Also seen from the part B of the figure, the buried Si waveguide core 320 is supported by a buried oxide material 304 to form the fiber coupler. In other words, the front end face 301 is made of both the cladding material 305 and the buried oxide material 304 while the head of tapered Si waveguide 320 is buried insider and not visible. Part of the whole piece of combined cladding material 305 and buried oxide support 304 with the tapered Si waveguide buried therein is suspended from the Si substrate 310. Therefore, air is above the cladding material 305 and below the buried oxide material 304 to provide a mode shield with the lowest index to reduce the optical power loss. The buried oxide material 304 can be replaced by other dielectric material with suitable refractive index. However, the cladding material 305 as it is in the structure of FIG. 3 lacks grading of index for proper adapting the mode except that the tapered shape provides certain index contrast change across the adaptor region, the power loss of the conventional fiber coupler is still about 3 dB or greater.

Figure 4:
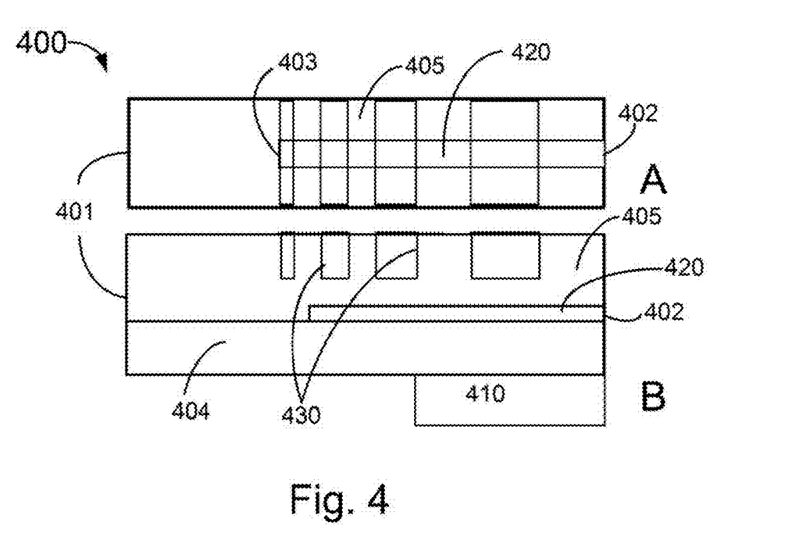
FIG. 4 is a simplified diagram of a top view (A) and a side view (B) of a suspended fiber coupler with taper or straight waveguide in a cladding of graded index created by periodically etched open slots according to an embodiment of the present invention.

FIG. 4 is a simplified diagram of a top view (A) and a side view (B) of a suspended fiber coupler with taper or non-taper waveguide in a cladding of graded index created by periodically etched open slots according to an embodiment of the present invention. This diagram is merely an example, which should not unduly limit the scope of the claims. One of ordinary skill in the art would recognize many variations, alternatives, and modifications. As shown, the fiber coupler 400 is substantially similar to the convention suspended fiber coupler 300 in most part except that etched periodic slots 430 are formed in the cladding material 405 at least in a region above the buried Si waveguide core 420 which is disposed on top of a dielectric material 405 overlying the silicon substrate 410.

Based on a predetermined pattern, the etch periodic slots 430 may be formed with a same or varied depth but non-uniform in width so that effective refractive index contrast of optical mode is gradually reduced along the adaptor region. In particular, the slots closer to the back end interface 402 is wider, then the slots gradually become narrower and have smaller slot-slot spacing towards the tail end 403 of the buried Si waveguide core 420. In this way, the average index value in the cladding increases from back end interface 402 towards the tail end 403, making a reduced index contrast versus waveguide core 420 along the same way.

Assisted by the reduced index contrast between the waveguide core and the cladding, the optical mode can be adiabatically expanded from back end interface 402 towards the tail end 403 to fill larger mode of fiber which is designed to be coupled with the front end face 401 where an effective index is higher. "Adiabatic" means that the mode transition is gradual enough to ensure that the guided optical mode is not coupled into radiation loss modes. The index-graded cladding provided in this embodiment is able to enhance the mode coupling efficiency from ~50% to about 75% or 80%. The air filling the etched slots has lowest index of 1, which helps to reduce the effective index contrast of the mode near the fiber coupling face and enhance the coupling efficiency of the fiber coupler. In this embodiment, the buried Si waveguide core 420 may be formed in tapered or non-tapered shape as the mode expansion from back end interface 402 to the front end face 401 may have been achieved by those etch periodic slots 430 within the cladding material 405.

Figure 5:
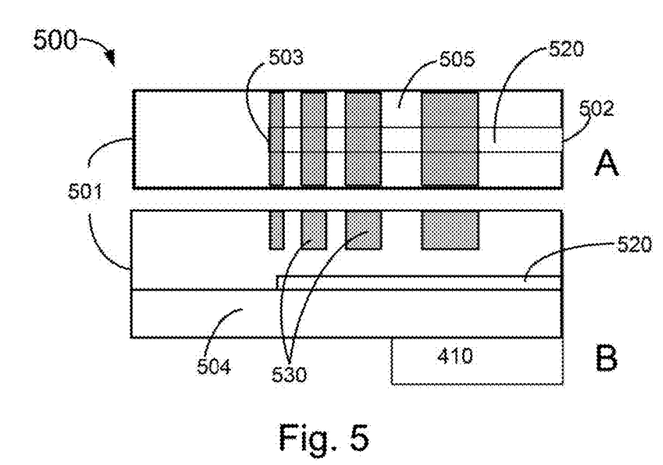
FIG. 5 a simplified diagram of a top view (A) and a side view (B) of a suspended fiber coupler with taper or straight waveguide in a cladding of graded index created by periodically etched slots filled with a suitable material according to an embodiment of the present invention.

FIG. 5 a simplified diagram of a top view (A) and a side view (B) of a suspended fiber coupler with taper or straight waveguide in a cladding of graded index created by periodically etched slots filled with a suitable material according to an embodiment of the present invention. This diagram is merely an example, which should not unduly limit the scope of the claims. One of ordinary skill in the art would recognize many variations, alternatives, and modifications. As shown, the suspended fiber coupler 500 is substantially the same as the fiber coupler 400 except that the etched periodic slots 530 formed in the cladding material 505 are filled with a dielectric material of suitable refractive index to maintain an adiabatically adaptation of optical mode change from fiber mode at the front end face to the Si waveguide mode at back end face with reduced power loss. For example, the refractive index of the dielectric material filling the slots 530 is preferred to be about 1.0~1.4. Various inorganic or organic materials having such refractive index may be selected. In this embodiment, the buried Si waveguide core 520 may be formed in tapered or straight shape as the mode expansion from back end face 502 to the front end face 501 may have been achieved by those etch periodic slots 530 within the cladding material 505.

Figure 6:
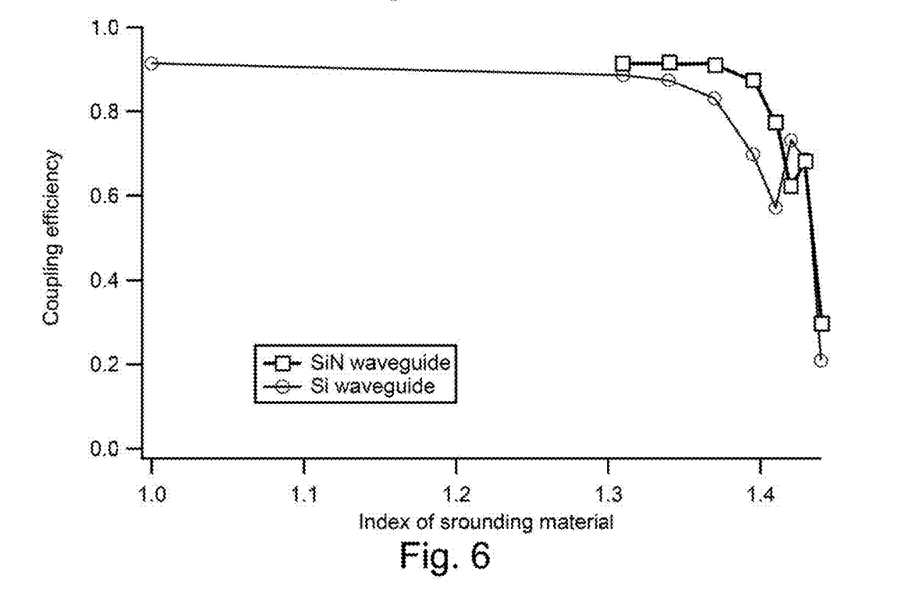
FIG. 6 is a plot of coupling efficiency versus index of surrounding materials of the fiber coupler according to various embodiments of the present invention.

FIG. 6 is a plot of coupling efficiency versus index of surrounding materials of the fiber coupler according to various embodiments of the present invention. This diagram is merely an example, which should not unduly limit the scope of the claims. One of ordinary skill in the art would recognize many variations, alternatives, and modifications. As shown, this is a plot of coupling efficiency versus refractive index of surrounding material in the cladding 405 or 505 that buries a taper or straight waveguide core 420 or 520 shown earlier for the suspended fiber coupler 400 or 500 according to one or more embodiments of the present invention with the waveguide core material being selected from SiN or Si with an index value of 1~1.4. It is suggested that for most materials with index value <1.3, coupling efficiency for the optical mode coupling between the fiber and Si waveguide can be 83% or higher. This is substantially improved over coupling efficiency value of 70% or less achieved for the conventional fiber coupler (e.g, 300 of FIG. 3). If SiN material is used for making waveguide core, the cladding material with index value between 1.3 and 1.4 still can be selected for making the fiber coupler with about 85% coupling efficiency, which provides much broader selections of various materials for the cladding.

Figure 7:
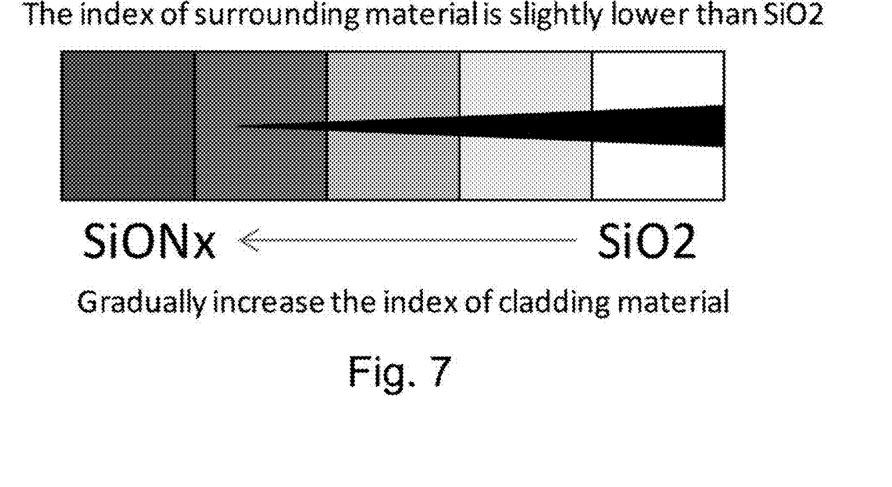
FIG. 7 is a simplified diagram of a top view of a suspended fiber coupler with taper waveguide in sectional cladding materials configured to gradually increase index from back end near waveguide to front end near fiber according to an embodiment of the present invention.

FIG. 7 is a simplified diagram of a top view of a suspended fiber coupler with taper waveguide in sectional cladding materials configured to gradually increase index from back end near waveguide to front end near fiber according to an embodiment of the present invention. This diagram is merely an example, which should not unduly limit the scope of the claims. One of ordinary skill in the art would recognize many variations, alternatives, and modifications. As shown, in this embodiment, the cladding material is switched from one uniform material with single value of refractive index to multiple stacks of sectional cladding material with gradually increasing index value from the back end region with SiO2 material to the front end region with SiONx material. Typically, SiO2 material index is about 1.44~1.47 and SiONx material index can be 1.7~1.9 or higher. In one embodiment, the sectional index-graded cladding material includes multiple different materials with their index values in an incremental order. In another embodiment, the sectional index-graded cladding material is a single material but processed with sectional doping or alloying. By increasing the index of cladding material gradually toward the front end face of the fiber coupler, the optical mode gradually becomes bigger and closer to the fiber mode. A taper waveguide is configured to be buried inside the sectional index-graded cladding material with a small tail end located inside a section of cladding with higher index value and with a gradually expanded width toward the back end face associated with section of SiO2 cladding for connecting with the buried Si waveguide core. The whole fiber coupler including the sectional index-graded cladding and a BOX (buried oxide) supporting layer or more generally a dielectric material (not shown in this top view figure) is configured to be surrounded by a material having slightly lower index than that of SiO2 so that the optical power from fiber is substantially confined within the cladding material to avoid power loss. Alternatively, the fiber coupler with above sectional index-graded cladding material can also be implemented in a suspended configuration using air as the surrounding material.

Figure 8:
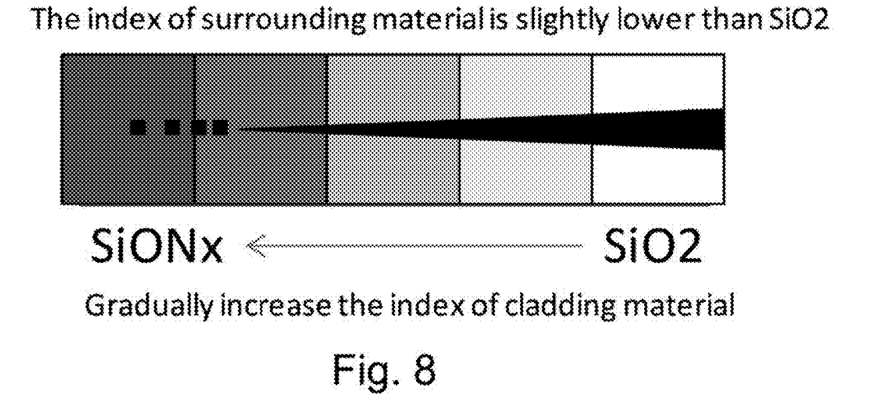
FIG. 8 is a simplified diagram of a top view of a suspended fiber coupler with added sub-wavelength grating at the end of taper waveguide in sectional cladding materials configured to gradually increase index from back end near waveguide to front end near fiber according to an embodiment of the present invention.

FIG. 8 is a simplified diagram of a top view of a suspended fiber coupler with added sub-wavelength grating at the end of taper waveguide in sectional cladding materials configured to gradually increase index from back end near waveguide to front end near fiber according to an embodiment of the present invention. This diagram is merely an example, which should not unduly limit the scope of the claims. One of ordinary skill in the art would recognize many variations, alternatives, and modifications. As shown, in this embodiment, the cladding material is still a multiple stacks of sectional index-graded material with gradually increasing index value from the back end region of SiO2 material to the front end region of SiONx material. A taper waveguide made of Si or SiN material is configured to be buried inside the sectional index-graded cladding material with a small tail end region near the SiONx material at the front end face and gradually expanded widths toward the back end face (for connecting with buried Si waveguide core). Additionally, between the small tail end region of the taper waveguide and the front end face, a sub-wavelength grating structure is added. In one embodiment, it is a structure formed with dispersed dots of Si or SiN material with predetermined spacing in between. This structure helps to achieve more gradual mode transition from the large fiber mode at the front end face to a smaller mode into the taper waveguide, further enhancing the fiber coupling efficiency. Again, the whole fiber coupler including the sectional index-graded cladding and a BOX support layer (not shown in this top view figure) is configured to be surrounded by a material having slightly lower index than that of SiO2 so that the optical power from fiber is substantially confined within the cladding material to avoid power loss. Alternatively, the fiber coupler can also be implemented in a suspended configuration using air as the surrounding material.

Figure 9:
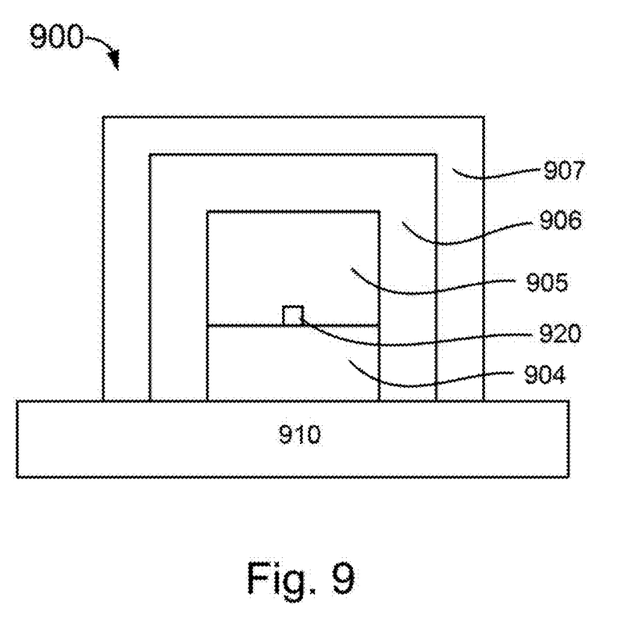
FIG. 9 is a simplified diagram of a side view from coupling face of a fiber coupler formed on silicon substrate and covered by multilayered cladding materials with graded shape and index according to an embodiment of the present invention.

FIG. 9 is a simplified diagram of a side view from coupling face of a fiber coupler formed on silicon substrate and covered by multilayered cladding materials with graded shape and index according to an embodiment of the present invention. This diagram is merely an example, which should not unduly limit the scope of the claims. One of ordinary skill in the art would recognize many variations, alternatives, and modifications. As shown, in this embodiment, the mode transition along the adaptor region (see FIG. 3) is implemented alternatively with one or more additional cladding materials surrounding the original cladding with a buried Si waveguide core (e.g., 320 of FIG. 3) in a layer-by-layer fashion with their index values being adiabatically changed from that of Si to that of air.

In an embodiment, the Si waveguide core 920, taper or straight, is buried between an inner cladding material 905 from top and a BOX layer 904 at bottom. The BOX layer 904 is disposed on a silicon substrate 910. The inner cladding material 905 can be made of SiO2 material and so does the BOX layer 904, having lower index value than Si. In certain embodiments described earlier, the inner cladding 905 can include an index-graded section over partial or entire adaptor region to enhance the mode transition. Additionally, A second cladding layer 906 is formed substantially to cover entire inner cladding material 905 and the side of the BOX layer along the entire adaptor region (into the paper and not visible from FIG. 9). The second cladding layer 906 can be made with decreasing thickness from the front end to the back end to provide additional index grading that helps to smoothen the mode transition. The second cladding layer 906 is a material having slightly lower index than the inner cladding material 905 to ensure the power loss being reduced to minimum. Further, a third or more outer cladding layers can be formed similarly to cover entire body of the second or previous layer. For example, a third layer 907 covers the second layer 906. The index values of these outer cladding layers gradually decrease to that of air which is out-most medium surrounding the fiber coupler 900.

Figure 10:
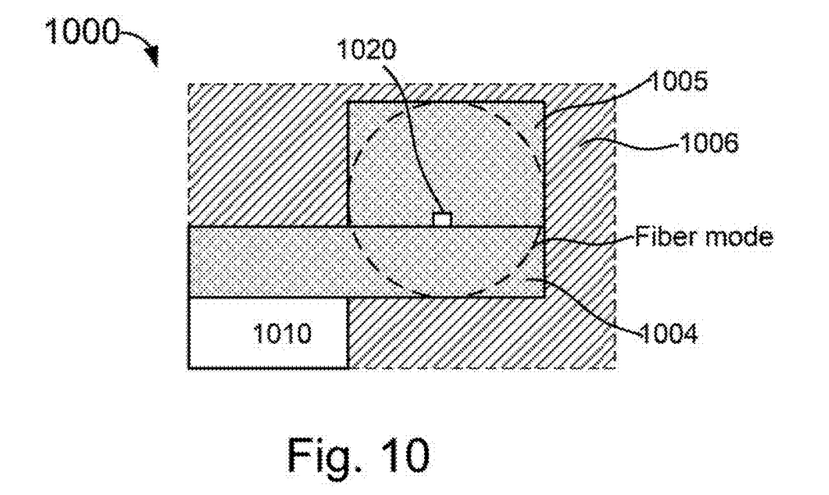
FIGS. 10 is a simplified diagram of a front side view of a partially suspended fiber coupler according to three embodiments of the present invention.

FIG. 10 is a simplified diagram of a front side view of a partially suspended fiber coupler according to three embodiments of the present invention. This diagram is merely an example, which should not unduly limit the scope of the claims. One of ordinary skill in the art would recognize many variations, alternatives, and modifications. In an embodiment, the partially suspended fiber coupler is a one-side-connected device instead of the cantilever-type fiber coupler shown in previous embodiments (e.g., 400 of FIG. 4 or 500 of FIG. 5) that is one-end-connected device. The partially suspended fiber coupler 1000 including a BOX layer 1004 made of SiO2 formed on a silicon substrate 1010. A waveguide 1020 (taper or straight) is formed on the BOX layer 1004 and covered by a cladding material 1005. Material on both sides of the cladding 1005 of fiber coupler 1000 are etched, but SiO2 material on one side of the BOX layer 1004 and part of silicon substrate below the BOX layer 1004 are etched out, forming a partial surrounding region 1006. The remaining portion of silicon substrate 1010 is still attached with the rest part of the BOX layer on another side that is not etched. In one embodiment, the partial surrounding region 1006 is left hollow with air (index=1) as a mode shield to prevent optical power loss by outward radiation. As shown in FIG. 10, the fiber mode is substantially adapted to the end face of the fiber coupler 1000 with minimum power loss. In another embodiment, the partial surrounding region 1006 is filled with a material having index value lower than that of cladding 1005 and BOX layer 1004. The filled partial surrounding region 1006 makes the fiber coupler no longer suspended. The embodiments described in FIG. 10 are optionally combinable with other embodiments shown in FIG. 4, FIG. 5, FIG. 7, FIG. 8, and FIG. 9. Note, the location of the buried waveguide core should be kept a sufficient distance away from the silicon substrate material below to avoid loss radiation into the substrate during the coupling. Typically, the safe distance of the buried waveguide core above the silicon substrate material is 3 µm or larger.

Figure 11:
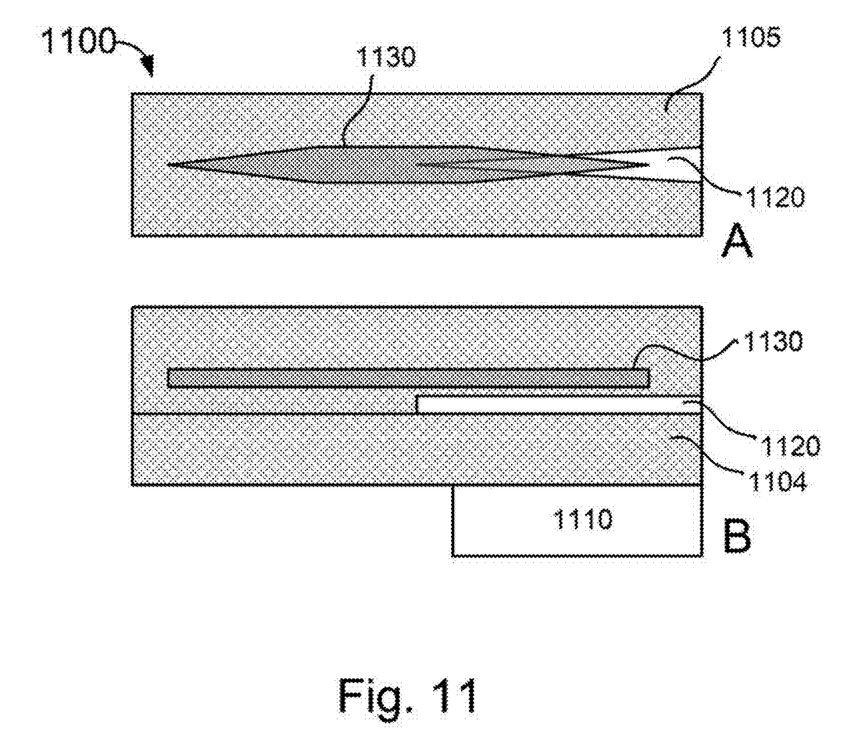
FIG. 11 is a simplified diagram of a top view (A) and a side view (B) of a suspended fiber coupler having a lower index material on top of taper waveguide in the cladding according to an embodiment of the present invention.

FIG. 11 is a simplified diagram of a top view (A) and a side view (B) of a suspended fiber coupler having a lower index material on top of taper waveguide in the cladding according to an embodiment of the present invention. This diagram is merely an example, which should not unduly limit the scope of the claims. One of ordinary skill in the art would recognize many variations, alternatives, and modifications. As shown, the suspended fiber coupler 1100 comprises an alternative mode transition scheme using a second buried waveguide core 1130 partially over a first buried waveguide core 1120. The first buried waveguide core 1120 is disposed near an interface region between cladding material 1105 and supporting BOX layer 1104. The second buried waveguide core 1130 is substantially embedded inside the cladding material 1105. The first buried waveguide core 1120 can be either tapered or straight having one end (usually the one with expanded dimension) at the back end face of the fiber coupler 1100 and another end (usually the tail end with smaller dimension) buried inside the cladding material. The second buried waveguide core 1130 is configured to have both ends in tapered shape while middle portion having expanded dimension. In an embodiment, the second buried waveguide core 1130 has one portion partially overlapped with the first buried waveguide core 1120. In that portion, both waveguides are tapered but in opposite direction. Additionally, the second buried waveguide core 1130 s specifically made by a material that has an index less than that of Si but greater than that of the cladding material 1105. This structural and compositional configuration further smoothens out the mode transition from the larger fiber mode to the small core of Si waveguide and enhances the fiber coupling efficiency. Certain embodiments described above can be combined to provide 20-25% enhancement in mode coupling efficiency.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A fiber-to-waveguide mode converter comprising:
    a silicon substrate member;
    a first dielectric material having an elongated body laid in a lengthwise direction from a back end to a front end with a portion proximate to the back end being supported by the silicon substrate member and a remaining portion proximate to the front end being suspended from the silicon substrate member or supported by a second dielectric material thereof;
    a first waveguide segment formed from the back end along the lengthwise direction to a tail end on the first dielectric member, the tail end being a distance short to reach the front end of the first dielectric material; and
    a first cladding material overlying both the first waveguide segment and the first dielectric material, the first cladding material having a refractive index smaller than the first waveguide segment and includes an index-graded structure formed at least over the first waveguide segment with decreasing index from the tail end toward the back end, wherein the index-graded structure comprises a plurality of patterned slots having a depth partially into the first cladding material and having increasing widths and increasing slot-slot spacing from a location proximate to the tail end of the first waveguide segment toward the back end.

2. The fiber-to-waveguide mode converter of claim 1 wherein the first dielectric material comprises silicon oxide material originated from part of a buried oxide layer overlying the silicon substrate member.

3. The fiber-to-waveguide mode converter of claim 1 wherein the first cladding material comprises SiO$_2$ material substantially covering the entire elongated body of the first dielectric material and the entire first waveguide segment from the back end to the tail end.

4. The fiber-to-waveguide mode converter of claim 1 wherein the first waveguide segment is made of Si or SiN material.

5. The fiber-to-waveguide mode converter of claim 1 wherein the second dielectric material is air.

6. The fiber-to-waveguide mode converter of claim 1 wherein the second dielectric material is an inorganic or organic material having refractive index value between 1.0 and 1.4.

7. The fiber-to-waveguide mode converter of claim 1 wherein each of the plurality of patterned slots is a cavity filled with air.

8. The fiber-to-waveguide mode converter of claim 1 wherein each of the plurality of patterned slots is a cavity filled with a third dielectric material having a refractive index less than 1.4.

9. The fiber-to-waveguide mode converter of claim 1 wherein the index-graded structure comprises multiple segments made by respective materials with increasing index values stacked along the lengthwise direction overlying the elongated body of the first dielectric material from the back end to the front end.

10. The fiber-to-waveguide mode converter of claim 1 wherein the first waveguide segment is tapered in decreasing width from the back end to the tail end.

11. The fiber-to-waveguide mode converter of claim 1 wherein the first waveguide segment is straight in a same width from the back end to the tail end.

12. The fiber-to-waveguide mode converter of claim 10 wherein the first waveguide segment additionally comprises a few dots separately disposed within the first cladding material in the lengthwise direction at different locations between the tail end and the front end, thereby adding a sub-wavelength grating for smoothening mode transition.

13. The fiber-to-waveguide mode converter of claim 1 wherein the index-graded structure comprises a second cladding material having a refractive index less than that of the first cladding material but greater than that of the second dielectric material, the second cladding material overlying the entire first cladding material with decreasing thicknesses along the lengthwise direction from the front end to the back end.

14. The fiber-to-waveguide mode converter of claim 1 further comprises a second waveguide segment buried inside the first cladding material, the second waveguide segment being configured with a first end portion partially over the first waveguide segment near the tail end and a second end portion near the front end of the first dielectric material, the second waveguide segment comprising a tapered shape having reduced widths at both the first end portion and the second end portion.

15. The fiber-to-waveguide mode converter of claim 14 wherein the second waveguide segment comprises a refractive index less than that of the first waveguide segment.

16. The fiber-to-waveguide mode converter of claim 14 wherein the second waveguide segment comprises SiN or SiONx material and the first waveguide segment comprises Si material.

* * * * *